US012797884B2

(12) United States Patent
Malcolm

(10) Patent No.: US 12,797,884 B2
(45) Date of Patent: *Nov. 17, 2026

(54) PRESSURE ACTUATED VALVES AND METHODS OF USE

(71) Applicant: Malco, LLC, Coarsegold, CA (US)

(72) Inventor: David B. Malcolm, Coarsegold, CA (US)

(73) Assignee: Malco, LLC, Coarsegold, CA (US)

(*) Notice: Subject to any disclaimer, the term of this patent is extended or adjusted under 35 U.S.C. 154(b) by 113 days.

This patent is subject to a terminal disclaimer.

(21) Appl. No.: 18/612,875

(22) Filed: Mar. 21, 2024

(65) Prior Publication Data

US 2024/0293834 A1 Sep. 5, 2024

Related U.S. Application Data

(63) Continuation of application No. 16/940,046, filed on Jul. 27, 2020, now Pat. No. 11,938,499.

(51) Int. Cl.
*F16K 17/06* (2006.01)
*B05B 12/08* (2006.01)

(52) U.S. Cl.
CPC ............ *B05B 12/087* (2013.01); *F16K 17/06* (2013.01)

(58) Field of Classification Search
CPC .............................. B05B 12/087; F16K 17/06
(Continued)

(56) References Cited

U.S. PATENT DOCUMENTS 1,193,302 A * 8/1916 Seltner ...................... E03C 1/06 4/567
1,832,724 A 11/1931 Mueller
(Continued)

FOREIGN PATENT DOCUMENTS

EP 1342141 B1 11/2001

OTHER PUBLICATIONS

Waterwolf, Homemade check Valves, Aug. 9, 2007.
(Continued)

*Primary Examiner* — Chee-Chong Lee
(74) *Attorney, Agent, or Firm* — Sierra IP Law, PC; Mark D. Miller

(57) ABSTRACT

The present invention provides unique pressure actuated valves and related methods that may be used in applications where a plurality of fluid emission devices are provided on a plurality of lines containing fluid under pressure, in order to prevent fluid from escaping from the fluid emission devices until a consistent threshold or predetermined level of fluid pressure is obtained in the lines, without causing significant water pressure and/or flow loss through the valves. Valves of the present invention include a housing having an upper body and a lower body that may be coupled together to form an inner chamber, the lower body having an inlet in communication with a source of fluid under pressure, the upper body having an outlet in communication with a fluid emission device. A hollow movable fluid transmission piston is provided in the chamber for communicating between the inlet and outlet. The chamber formed between the upper and lower bodies may be provided with cup seals at opposite ends of the chamber to reduce friction and prevent fluid from entering therein, and a side air vent. A wider lower end of the piston is urged toward the lower housing body using a biasing mechanism, which pushes an O-ring at the lower end against a stop to prevent fluid from entering into the hollow center of the piston. When fluid with a sufficient pressure is provided from the source, it pushes the O-ring away from the stop and against the urging of the biasing member, allowing fluid to flow around the stop, through the center of the piston, and out through the upper body into the fluid emission device. The vent in the chamber allows air inside the chamber (surrounding the biasing
(Continued)

mechanism) to escape so that there is no added air pressure within the chamber to be overcome by the fluid pressure.

17 Claims, 9 Drawing Sheets

(58) Field of Classification Search
USPC ............................................................ 239/11
See application file for complete search history.

(56) References Cited

U.S. PATENT DOCUMENTS

| | | | | | |
|---|---|---|---|---|---|
| 2,810,607 | A | | 10/1957 | Hurby, Jr. | |
| 3,011,520 | A | * | 12/1961 | Barkelew | F16K 19/00 137/382.5 |
| 3,034,138 | A | * | 5/1962 | Filliung | F16K 19/00 4/570 |
| 3,471,872 | A | * | 10/1969 | Symmons | E03C 1/0408 4/570 |
| 4,191,332 | A | | 3/1980 | De Langis et al. | |
| 4,562,962 | A | | 1/1986 | Hartman | |
| 4,716,937 | A | | 1/1988 | Hendrickson | |
| 4,752,975 | A | * | 6/1988 | Yates | E03C 1/06 239/443 |
| 4,913,352 | A | | 4/1990 | Witty | |
| 5,215,254 | A | | 6/1993 | Haruch | |
| 5,220,697 | A | * | 6/1993 | Birchfield | A47K 3/281 74/544 |
| 5,329,650 | A | * | 7/1994 | Zaccai | E03C 1/0408 4/596 |
| 5,375,768 | A | | 12/1994 | Clark | |
| 5,465,752 | A | | 11/1995 | Higgins | |
| 6,026,850 | A | | 2/2000 | Newton | |
| 6,186,413 | B1 | | 2/2001 | Lawson | |
| 7,185,830 | B2 | | 3/2007 | Malcolm | |
| 7,681,807 | B2 | | 3/2010 | Gregory | |
| 8,667,623 | B2 | | 3/2014 | Paget | |
| 9,162,244 | B2 | | 10/2015 | Kah, Jr. | |
| 9,707,574 | B2 | | 7/2017 | Soetaert | |
| 10,687,603 | B1 | | 6/2020 | Malcolm | |
| 2006/0278727 | A1 | | 12/2006 | Kah, Jr. | |
| 2016/0074896 | A1 | | 3/2016 | Kah, Jr. | |

OTHER PUBLICATIONS

Hendrickson, Hendrickson ¾ Low Flow Pressure Reducer—Thread Type: Hose—PSI:25 PSI, Dec. 10, 2019.
Hendrickson Bros, Hendrickson CV Check Valve ½", 2017.
Hendrickson, Hendrickson PR-DG5010-1, Dec. 10, 2019.
Hendrickson Bros, Irrigation-Mart, Sep. 30, 2016.
Hendrickson, Hendrickson ¾ Low Flow Pressure Reducer—Thread Type: Hose—PSI:10PSI, Dec. 10, 2019.
Hendrickson, Hendrickson DG5025 25 PSI Pressure Regulator with Low Flow ¾" FHT×MHT | DG5025-1, Dec. 10, 2019.
Hendrickson Bros, PGS Rotor, 2017.
Hendrickson Bros, Hendrickson—Model PR5500—Low-Medium Flow Pressure Regulator, Dec. 10, 2019.
Hendrickson, DG41 Atmospheric Vacuum BreakerDG5000 Preset Pressure Regulator, 2015.
Grower Solution, Low Flow Pressure Regulator—¾" FHT×MHT, Dec. 10, 2019.
Ian Rebello, Shaving Showerhead Mirror by Reflect, Jul. 28, 2012.

* cited by examiner

PRESSURE ACTUATED VALVES AND METHODS OF USE

PRIORITY CLAIM

This is a continuation of U.S. patent application Ser. No. 16/940,046 filed on Jul. 27, 2020 which is incorporated herein by this reference in its entirety.

FIELD OF THE INVENTION

The present invention relates generally to valves for use in agricultural irrigation and methods of making and using the same. More particularly, the present invention relates to pressure activated valves for irrigation lines having a plurality of sprinkler heads arranged in series, wherein it is advantageous to activate and deactivate all such heads simultaneously at a threshold or predetermined water pressure without causing significant water pressure or flow loss through the valves.

BACKGROUND OF THE INVENTION

There are many benefits to providing consistent irrigation to agricultural and horticultural plantings. Providing consistent volumes of water to all areas of a field where trees, vines, crops or turf are growing each time irrigation takes place allows a grower to select and preset irrigation sprinklers or sprinkler heads to provide a desired amount of water at each location in the field. This facilitates growing plants with consistent sizes, and providing crops with consistent ripeness, or providing turf or ornamentals with consistent richness and color. This also allows the field to be maintained and harvested in a consistent manner.

Agricultural irrigation systems typically deliver water from a single, high-pressure source. The irrigation lines in such a system are typically laid out in a pattern, with larger lines leading to branch lines with sprinklers or sprinkler heads on them. For example and without limitation, one or more long primary lines may run from the water source along the length of a side of a field, and several secondary lines may branch off from the primary line(s), each of the secondary lines including many sprinkler heads arranged in series along their lengths.

In order to consistently deliver water to all areas covered by the sprinklers and irrigation lines, each sprinkler head must receive sufficient water pressure from the irrigation line it is attached to. In conventional irrigation systems, when the high-pressure water source is opened up, water pressure runs out linearly from the source through the primary line(s), reaching the closest sprinklers of the closest secondary line first, and then gradually running the length of the closest secondary line, as well as to and down subsequent secondary lines, etc. Thus, the secondary lines which connect to the distal end(s) of the primary line farthest from the water pressure source may not receive water pressure until substantially later than the secondary lines which are proximal or closer to the water source. Also, the sprinkler heads on each secondary line that are farther from the primary line will not receive water pressure to cover their area of the field until substantially later than the sprinkler heads that are closer to the primary line.

If the sprinklers in such a system are simply left open, then water will be allowed to escape from the sprinklers closer to the water source as soon as the water under pressure reaches these sprinklers, thereby reducing pressure in the lines and further delaying, and in some cases preventing, water under pressure from reaching other sprinklers that are farther away. This can result in the areas which are closest to the high-pressure water source receiving more water, and for a longer duration, than those areas which are farther away from the source, resulting in a disparity in watering of the plants in the field or orchard. Such inconsistent watering can lead to lost or damaged plants, smaller fruit, uneven harvesting times, and other problems.

In response, stop valves have been developed which may be placed at each sprinkler or sprinkler head to prevent water from exiting through each sprinkler until a certain threshold of pressure has been reached. Through the use of such valves, water is prevented from exiting through any sprinklers until all lines in the sprinkler system have reached the threshold water pressure. When this pressure is reached, the valves open substantially simultaneously allowing water to escape through the sprinklers. Unfortunately, existing stop valves require that the water pressure reach extremely high levels before they will open and allow watering to take place. Accordingly, these valves cannot be used in large systems or systems where sufficiently high water pressure cannot be easily achieved. Other stop valves utilize complicated internal structures and passageways which tend to disrupt the even flow of water to the sprinkler head, resulting in uneven and inconsistent delivery of water. The complicated nature of such valves will also inevitably result in higher failure rates. Existing valves also use O-rings as seals which tend to stick or get jammed preventing the valve from opening, and which provide ineffective sealing in that the seal area is small. O-rings also expose the internal valve structures to impurities commonly found in rural water sources, such as grains of sand or other materials, which may break the seals and cause damage to and/or malfunctioning of the internal valve structure.

As a result, there is a need for a reliable irrigation sprinkler stop valve which can be effectively used in large or low water pressure sprinkler systems and where impurities may be found in the source water.

SUMMARY OF THE INVENTION

The present invention provides unique pressure actuated "start" valves and related methods that may be used in applications where a plurality of fluid emission devices are provided on a plurality of lines containing fluid under pressure in order to prevent fluid from escaping from the fluid emission devices until a consistent threshold level of fluid pressure is obtained in the lines. The most common applications will be in agricultural irrigation systems having a plurality of lines with sprinklers or sprinkler heads thereon, where embodiments of the valves of the present invention may be provided on each irrigation sprinkler or sprinkler head to prevent the sprinklers or sprinkler heads nearer to a water source from dispensing water until the a threshold pressure level is reached in the entire system of lines, at which time all valves will open nearly simultaneously (i.e., "start"), allowing all sprinklers and sprinkler heads to receive equal amounts of water. It is to be appreciated that embodiments of the present invention may be used in applications other than agriculture where a plurality of fluid emission devices are provided on lines containing fluid under pressure, including, for example and without limitation, fire suppression systems that include a plurality of sprinkler heads.

Embodiments of the valves of the present invention may include a housing having an upper body and a lower body that may be coupled together to form an inner chamber, the lower body having an inlet in communication with a source of fluid under pressure, the upper body having an outlet in communication with a fluid emission device, and a hollow movable fluid transmission piston in the chamber for communicating between the inlet and outlet. Embodiments of the chamber formed between the upper and lower bodies may be provided with cup seals at opposite ends of the chamber, and at least one air vent. Cup seals are preferred over O-rings to seal the movable piston within the chamber because cup seals involve less friction with the sides of the chamber, thereby allowing the piston to travel more smoothly with less chance of the piston getting stuck in place or otherwise malfunctioning. A wider lower end of the piston is urged toward the lower body using a biasing mechanism, which pushes an O-ring at the lower end against a stop to prevent fluid from entering into the hollow center of the piston. When fluid under pressure is provided from the source, it pushes the O-ring away from the stop and against the urging of the biasing member. When the fluid reaches sufficient threshold pressure, the O-ring separates from the stop, allowing fluid to flow around the stop, through the center of the piston, and out through the upper body into the fluid emission device. This direct flow of fluid through the valve minimizes turbulence and avoids water pressure loss that might otherwise prevent the valve from opening at the correct threshold. The vent in the chamber allows air inside the chamber (surrounding the biasing mechanism) to escape so that there is no added air pressure within the chamber that the fluid pressure must overcome.

Embodiments of the valves of the present invention may be operable to prevent flow of water from an irrigation line to an emission device (e.g., a sprinkler) of that irrigation line until a threshold water pressure is reached in an irrigation line. In some embodiments the threshold water pressure may be in a range of about 10 PSI to about 30 PSI, and more commonly from about 20 PSI to about 25 PSI, although embodiments of the invention may be adapted for higher or lower water pressures depending on the PSI needed for the attached emission devices (sprinklers) to fully function.

For example and without limitation, a given set of sprinklers may require 35 PSI in order to fully function (i.e. provide full spray, or full rotation). It is typical for such a system to be able to provide more than this amount of pressure to be sure that all sprinklers fully perform. Thus, the system may be able to provide a final water pressure in the range of approximately 50-60 PSI. It is also typical for the pipes of an irrigation system to be portable, such that they are assembled and placed in a field, and after use (e.g., at the end of the season) they are disassembled and stored or moved to another field. In situations where the pipes are not permanent, they are ordinarily connected together using seals at the joints between pipes. These seals ordinarily require a certain initial level of water pressure, for example 20 PSI, in order not to leak. Accordingly, the irrigation system must first reach the PSI level needed to close up all seals in the joints of the pipes before reaching the threshold PSI level required to open the valves. Then, the pressure needs to continue to increase to a level where the sprinklers fully perform. Thus, in such a situation, exemplary valves of the present invention may have a threshold opening PSI of approximately 25 PSI. So, in this example, the pressure first builds in the system until all of the joint seals stop leaking, at approximately 20 PSI. Then the pressure continues to increase such that the valves begin opening around 25 PSI. This is below the amount required for the sprinklers to fully function, but starts the flow through the sprinklers without significant water pressure loss. The pressure continues to increase such that when it reaches 35 PSI, the sprinklers are fully performing. The pressure may continue to increase to a level desired by the grower (e.g. 50 to 60 PSI) so that the grower is satisfied that every sprinkler fully performs.

It is to be appreciated from the above example that the threshold water pressure selected for the valves should be greater than that needed to seal up the joints in the irrigation system, but less than that required for the valves to fully function. This allows the water pressure to continue to be raised without significant pressure loss.

The selected or calculated resistance to actuation provided by the valves of the present invention may allow for water to fill the entire irrigation system, thus allowing water to reach all emission devices of the irrigation system, before any single pressure actuated valve of the system is actuated. Water pressure may thus continue to build evenly throughout the irrigation system until the threshold water pressure arrives at all valves of the irrigation system, causing all of the valves to open generally simultaneously allowing all emission devices to begin distributing water simultaneously. When the water pressure is shut off or drops below the threshold, all of the valves will close generally simultaneously. This allows all areas of an orchard, field, lawn, or yard (each of these hereafter generally included in any reference to a “field”) covered by the irrigation system to receive the same amount of water for the same amount of time.

In embodiments of the invention, a water passage of a pressure actuated valve is exposed to water pressure in the system. The water passage may comprise a housing having an inlet end having a greater diameter than the remainder of the water passage, and the inlet end may comprise a first sealing member which is in contact with an inner surface of the housing, thereby sealing off the inlet of the housing from an adjacent chamber. The inlet end may further be held against a stop of the housing inlet in a sealed position, using a biasing mechanism to prevent water from flowing through the valve. The inlet end, along with the first sealing member, may therefore act as a pressure plate sensitive to water pressure in the housing inlet. As system water pressure builds, the water pressure at the housing inlet may increase, providing an increasing upward force (i.e., toward to a housing outlet) against the inlet side of the pressure plate, and the biasing mechanism may provide a downward opposing force against the pressure plate.

Once a water pressure threshold is reached in the inlet of the housing, the force of the biasing mechanism on the water passage inlet may be overcome, moving the water passage from a sealed position in contact with a stop, to an open position in which the inlet end of the water passage is open to the flow of water from the inlet of the housing. The water may then flow from the irrigation line through the inlet into the housing, and out through the outlet end of the housing, then through the emission device, and out to the area of the field covered by the emission device.

Embodiments of the chamber of the invention that holds the piston and biasing mechanism may be sealed against influx of irrigation water passing through the valve. Each chamber may be sealed against water influx from the inlet by a first sealing member, preferably a U-cup seal, which may be arranged at the perimeter of the inlet end of the housing to create a seal between the inlet end and an interior surface of the inlet of the housing. The first sealing member may be operable to maintain this seal despite sliding up and down along the interior surface of the housing due to the reciprocal actuation movement of the piston. The chamber may further be sealed against influx of water from the outlet at the opposite end of the housing by the second sealing member, also preferably a U-cup seal, which may be arranged at the perimeter of the outlet end of the housing to create a seal between the outlet end and an interior surface of the outlet of the housing. The second sealing member may be operable to maintain this seal despite a sliding, reciprocal actuation movement of the piston. The first and second sealing members may thereby close the chamber entirely from the flow of irrigation water passing through the valve. U-cup seals are preferred because the involve less friction with the sides of the chamber, thereby allowing the piston to travel more smoothly within the chamber, and reducing the chances of the piston getting stuck in place or otherwise malfunctioning.

A vent may be provided in the chamber of embodiments of the invention to prevent air pressure from building up inside the chamber, without which additional fluid pressure may be needed to overcome both the biasing member and the air pressure inside the chamber, thereby avoiding a delay in opening the valve or shutting off the valve prematurely. The vent members of the present invention may be operable to equalize the air pressure in the chamber with the atmosphere outside the chamber, preventing increased air pressure in the chamber due to the actuation movement of the piston in the water passage (e.g., reducing the total volume inside the chamber). In embodiments of the invention, the vent may be provided in a wall of the housing. The vent may allow air in the chamber to move out into the atmosphere (e.g., the air immediately outside the housing of the chamber, whether inside a building or other structure, or outside and open to the sky) when the water passage moves from the sealed position to an open position. Correspondingly, when water pressure in the irrigation system falls back below the threshold water pressure, the vent may allow air to flow from the atmosphere into the chamber as the water passage moves from an open position to the sealed position (e.g., increasing the total volume inside the chamber).

In other embodiments, the valve may comprise an air pressure sink (e.g., an inflatable vessel such as an elastic pouch) attached to an outer surface of the housing and over the outer opening of the vent, with which air from the chamber may be exchanged via the vent in order to prevent a substantial rise in air pressure inside the chamber. For example, when the water passage moves from the sealed position to an open position, the air pressure sink may expand due to air being pushed out of the chamber. The air pressure sink may reduce in size when the water passage moves from an open position to the sealed position, as air in the air pressure sink returns to the chamber.

The first and second sealing members are designed to prevent the transmission of water pressure into the chamber. It is to be appreciated that the lower sealing member prevents incoming water from entering the chamber, and the upper sealing member prevents water that has passed through the piston from entering the chamber. If either of these seals were broken, water could enter the chamber and thereby equalize the pressure on both sides of the piston, such that no fluid pressure would be exerted against the biasing member which would prevent the valve from opening. For this reason, it is important to have reliable seals on both sides of the chamber, which are preferably U-cup seals as opposed to O-rings. U-cup seals are preferred over O-rings because there is less friction with U-cup seals than with O-rings. Reduced friction on the sealing surfaces makes it easier for the valve to open and close (less sticky).

In one aspect, the present invention relates to a pressure activated valve for an irrigation system having a plurality of emission devices. In some embodiments, the valve may comprise the following major components: a housing having an inlet and an outlet, and a stop at said inlet; a chamber in said housing that is sealed at an inlet end by a first sealing member, and sealed at an outlet end by a second sealing member, said chamber enclosing a movable piston within the chamber, the piston comprising a water passage having an inlet end and an outlet end and a hollow interior; a biasing mechanism in said chamber for biasing said piston against said stop until fluid at said inlet is at least equal to a threshold pressure.

Embodiments of the housing of the present invention may comprise a substantially cylindrical inner shape having an inlet at a first end and an outlet at a second end. The first end may comprise an attachment mechanism for engaging with an irrigation line, and the second end may comprise an attachment mechanism for engaging with an emission device. In some embodiments, the attachment mechanism of the first end may comprise a threading complementary to a threading of a connector of the irrigation line. In some embodiments, the attachment mechanism of the second end may comprise a threading complementary to a threading of the emission device. In other embodiments, one or both of the attachment mechanism of the first end and the attachment mechanism of the second end may comprise at least one of a press fitting or other friction-based connection, a barb, a ball bearing and sleeve connector common to pneumatic systems, a clamp, a clip, a bolt, a screw, and the like.

In some embodiments of the housing of the present invention, the first end may comprise a stop, the stop being operable to both provide a physical barrier against which one end of the piston may be engaged by the force of the biasing mechanism against the inlet end, creating a watertight seal at the inlet end. In some embodiments, the stop may comprise a central member and a plurality of supporting arms, wherein fluid may pass between said plurality of support arms when said seal is opened. In some embodiments, the central member of the stop may comprise a domed or substantially conical shape, wherein the peripheral edge of the dome or cone may press against an O-ring on said piston, forming a watertight seal therewith. In some embodiments, the plurality of support arms may support the central member against the biasing force of the biasing mechanism, the support arms contacting a shoulder of the inlet. In some embodiments, the support arms may be guided along the shoulder of the inlet via a circumferential groove in the inner surface of the housing.

Embodiments of the housing of the present invention may comprise one or more substantially smooth, cylindrical inner surfaces, one such surface at an inlet end of the housing, and another cylindrical surface at an outlet end of the housing. Embodiments of the housing may comprise two parts which may be coupled, joined or threaded together to form a single unit. Embodiments of the housing define an inner chamber which holds a spring and piston, as described elsewhere herein. The inner chamber is sealingly separated from the inlet and outlet of the housing. The inner cylindrical surface at the inlet of the housing may be in contact with and create a watertight seal with the first sealing member, preferably a cup ring (U-cup seal), which may be arranged at the perimeter of the inlet end of the housing. The inner cylindrical surface at the outlet of the housing may also be in contact with and create a watertight seal with a second sealing member, preferably a cup ring, which may be arranged at the perimeter of the outlet end of the housing. The first and second sealing members are designed to prevent water from entering the inner chamber.

The outer surface of the housing may comprise a gripping mechanism for allowing a user to better grip the housing while connecting or disconnecting the valve from an irrigation line or an emission device. In some embodiments, the grip may comprise a polygonal cross-sectional shape (e.g., a square, a pentagon, a hexagon, a heptagon, an octagon, or the like). In some embodiments, the grip may comprise a material having a high coefficient of friction (e.g., a rubber cover) or a roughened surface in order to improve the grip of a user holding the valve. The housing should be made of a rigid durable material, such as strong plastic or metal. In some embodiments, the upper and lower bodies are hex shaped so that they can be installed with a wrench.

In some embodiments, the housing may comprise a vent for equalizing air pressure inside an inner chamber in the housing and the atmosphere outside the housing. In some embodiments, the vent may comprise one or more passages traversing a wall of the housing, from an inner surface of the housing to an outer surface of the housing. In some embodiments, the vent may comprise one or more small holes drilled through a wall of the housing. In some embodiments, the vent(s) may be operable to allow air to pass from the chamber to the atmosphere and vice versa. In other embodiments, the housing may comprise one or more air pressure sinks operable to receive air from the chamber without substantially increasing in air pressure. In some embodiments, the air pressure sink(s) may comprise an elastic vessel similar to a small balloon attached to the outer surface of the housing, over the vent(s). The air pressure sink(s) may protect against dirt or other contaminants from the environment entering the chamber through the vent(s).

In some embodiments, the housing may comprise a plurality of segments (e.g., an inlet segment end and an outlet segment). The housing may thus be separated in order to allow access to the chamber and to the internal components of the valve (e.g., a water passage piston, the sealing members, the biasing mechanism, the inner end of the vent, and one or more guides). The inlet segment and outlet segment may comprise complementary attachment mechanisms for connecting to each other. In some embodiments, the complementary attachment mechanisms may comprise complementary threadings to allow for adjustment of the length of the housing and the length of the chamber which is defined in part by the housing. In some embodiments, the inlet segment may comprise a female threading and the outlet segment may comprise a male threading. In other embodiments, the inlet segment may comprise a male threading and the outlet segment may comprise a female threading. Adjusting the length of the housing of the present invention may thus allow for adjustment of the load on the biasing mechanism housed in the chamber, and thereby adjust the threshold water pressure which is required to overcome the force of the biasing mechanism to actuate the valve. In some embodiments, the complementary attachment mechanism of the inlet segment and/or the outlet segment may comprise at least one of a press fitting or other friction- based connection, a barb, a ball bearing and sleeve connector common to pneumatic systems, a clamp, a clip, a bolt, a screw, and the like.

Without limiting the invention, embodiments of the biasing mechanism may comprise a spring having a first end in contact with an annular ridge on the inlet end of the piston at one end of the chamber, and a second end which is in contact with at a member at the opposite end of the chamber. This member may be an inner surface of the chamber, but is preferably in the form of an annular guide or washer which is separate from but encircles or slidably engages the piston member. Threading or unthreading the two parts of the housing together may decrease or increase the size/length of the internal chamber, and therefore increase or decrease the load on the spring. Threading the two housing parts together will compress the spring, thereby increasing the biasing force on the piston. Conversely, unthreading the two housing parts may reduce the load on the spring (i.e., by decompressing the spring), reducing the biasing force on the piston. Thus, threading the outlet segment of the housing into or out of the inlet segment of the housing may also increase or decrease, respectively, the threshold water pressure required to actuate the valve. It is to be appreciated that replacing the spring with a stronger or weaker spring may also be used to change the threshold water pressure needed to activate the valve.

Embodiments of the hollow piston may comprise an inlet end and an outlet end. In some embodiments, the piston may comprise a substantially cylindrical inner surface or bore operable to provide a passage for water to pass from the inlet of the housing to the outlet of the housing without entering the chamber. In some embodiments, the inlet end of the piston may comprise an outer dimeter substantially greater than on outer diameter of the remainder of the piston. In some embodiments, the inlet end of the piston may comprise a circumferential groove having a shape complementary to a shape of the first sealing member, such that the first sealing member may securely nest within the circumferential groove, maintaining watertight contact with both the inlet end of the piston and an inner surface of the housing. In some embodiments, the first sealing member may be in the form of a cup ring (U-cup seal) made of an elastic material (i.e., a rubber, vulcanized rubber, nylon, plastic, and the like) operable to experience compression between an outer surface of the inlet end (e.g., a surface of the circumferential groove) and an inner surface of the housing. In some embodiments, the first sealing member may be substantially permanently sealed to either an outer surface of the piston, or an inner surface of the housing at the inlet end, or both. In such embodiments, the first sealing member may comprise a thin, flexible sheet of material operable to fold up or stretch out, as the inlet end of the piston reciprocates according to water pressure on one side and the urging of the spring on the other side. In alternative embodiments, instead of a U-cup seal, a flexible diaphragm may be attached to the outer edge of the piston and to the inner edge of the chamber wall to provide a seal which allows the piston to reciprocate.

In embodiments of the piston, the inlet end may comprise an opening, the opening providing fluid communication through the piston to the outlet end, allowing irrigation water to flow through the valve when the piston is moved to an open position. In some embodiments, the opening may comprise a passage seal, the passage seal being operable to form a watertight seal with the stop when the piston is in the sealed position. In some embodiments, the passage seal may be substantially ring-shaped, and may have a substantially circular cross section (e.g., an O-ring). The passage seal may comprise an elastic material operable to withstand compression between the inlet end of the water passage and the stop while maintaining watertight contact with the stop. In some embodiments, the passage seal may be permanently attached to the inlet end of the piston. In other embodiments, the passage seal may be nested in a circumferential groove at or adjacent to the edge of the opening in the inlet end of the piston. The outlet end of the piston may comprise a substantially smooth outer surface having a substantially cylindrical shape. In some embodiments, the outer surface may be operable to maintain watertight contact with a surface of a second sealing member positioned at the outlet of the housing. In some embodiments, the distal-most edge of the outlet end may movably traverse and extend past the second sealing member, into the outlet of the housing.

In some embodiments, the piston may comprise a substantially cylindrical outer surface, which, along with the substantially cylindrical inner surfaces of the housing, may be operable to provide a passage for water to pass from the inlet of the housing through the piston to the outlet end of the housing without entering the chamber. In such embodiments, the chamber may comprise an axially central position within the housing, and the water may flow through the center of the piston in the chamber. In such embodiments, the first sealing member may comprise a ring shape positioned at or near a bottom edge of the outer surface of the inlet end of the piston (e.g., in a circumferential groove adjacent to the bottom edge of the inlet end).

Embodiments of the present invention may comprise a passage guide or washer operable to control a position of the outlet end of the piston as it moves. In some embodiments, the passage guide may comprise a collar nested in the housing at or adjacent to the outlet of the housing, the collar having an inner diameter substantially similar to an outer diameter of the outlet end of the piston, and having an outer diameter substantially similar to an inner diameter of a portion of the housing in which the collar is nested. In some embodiments, the collar may be nested in a substantially cylindrical shoulder area located between the chamber and the outlet of the housing, the shoulder area having a diameter substantially smaller than a diameter of the chamber.

In some embodiments, the second sealing member may be nested in the shoulder area of the housing, and may be operable to maintain watertight contact with both a surface of the shoulder area and an outer surface of the outlet end of the piston, thus preventing water from passing from the outlet of the housing into the chamber. In some embodiments, the passage guide may be installed over the second sealing member within the shoulder area of the housing (e.g., such that the second sealing member is secured in the shoulder area by the passage guide being pressed into the shoulder area after the second sealing member has been installed in the shoulder area). In some embodiments, the second end of the biasing member may be in contact with the passage guide, wherein the second end of the spring provides a force against the passage guide to secure the passage guide against the sealing member nested in the shoulder area.

In some embodiments, the shoulder area may comprise a plurality of tiers, each tier having a different diameter. In some embodiments, the diameter of the tiers may decrease in the order from most proximal to the chamber to most distal to the chamber. In some embodiments, the plurality of tiers may comprise a first, proximal tier and a second, distal tier, wherein the second sealing member is installed in the second tier and the passage guide is seated in the first tier, securing the second sealing member in the second tier of the shoulder area.

In some aspects, embodiments of the pressure actuated valve of the present invention comprise a housing having a fluid inlet, a fluid outlet, and a central chamber; a hollow movable piston traversing said chamber, said piston having a fluid inlet adjacent to said housing inlet and a fluid outlet adjacent to said housing outlet; a first U-cup seal between said housing inlet and said piston, and a second U-cup seal between said housing outlet and said piston for sealing said chamber; at least one air vent in a wall of said chamber; a stop at said housing inlet, and a third seal on said movable piston for engagement with said stop for preventing fluid from flowing into said hollow piston when said third seal is engaged against said stop; and a biasing member on said piston for urging said third seal against said stop; wherein increased fluid pressure at said housing inlet causes said piston and said third seal to move said biasing member when a threshold pressure is reached, separating said stop from said third seal, and allowing fluid to enter into and pass through said hollow piston and exit through said housing outlet. In other aspects, embodiments of the valve housing comprise two parts which may be coupled together to form the chamber or uncoupled to allow access to said chamber. In other aspects, embodiments of the valve include a stop having a central head for temporary engagement with said third seal, and a plurality of arms having gaps between them through which fluid may flow, each of said arms being engaged with a cylindrical groove in said housing inlet for holding said stop in place. In other aspects, embodiments of the valve, the said piston inlet further comprises a pair of annular rings defining a circumferential gap therebetween and wherein said first cup seal is provided in said circumferential gap. In other aspects, embodiments of the valve further comprises an annular guide slidably engaged around said piston outlet and wherein said second cup seal is provided around said piston between said annular guide and said housing outlet. In other aspects, embodiments of the valve are in fluid communication with an irrigation water line and in fluid communication with an emission device. In other aspects, embodiments of the valve the length of the chamber may be adjusted by adjusting the distance between the coupled housing parts in order to change the amount of threshold water pressure needed to move said biasing member. In other aspects, embodiments of the housing parts comprise complementary threadings, and the threshold water pressure is adjusted by threading said housing parts into or out of each other. In other aspects, embodiments of the valve the third seal has a ring shape to provide a watertight seal against the central head of said stop to prevent water from entering the hollow piston while in a sealed position.

In other aspects, embodiments of the pressure actuated valve of the present invention comprise valve for an irrigation system comprising a housing defining an internal chamber, said housing having an inlet end in fluid communication with an irrigation line, and an outlet end in fluid communication with a sprinkler head, said inlet end comprising a stop; a hollow piston having an inlet at said inlet end and an outlet at said outlet end, and a seal at said piston inlet operable to provide a watertight seal against said stop; a biasing member in said chamber, said biasing member being operable to bias said piston inlet against said stop unless water in said inlet end reaches or exceed a threshold pressure; a first sealing member operable to provide a watertight seal between said piston inlet and said chamber to prevent water from entering said chamber at said inlet end; a second sealing member operable to prevent water from entering said chamber at said outlet end; and at least one vent in a wall of said chamber for allowing air to enter or exit said chamber.

In other aspects, embodiments of the pressure actuated valve of the present invention comprise a method of using irrigation start valves comprising the steps of providing an irrigation line having a plurality of openings thereon; installing a pressure actuated valve at each such opening, each of said pressure actuated valves comprising a housing having an inlet and an outlet, a sealed internal chamber, and a stop at said inlet, a hollow piston traversing said chamber, said chamber comprising an inlet end and an outlet end, said chamber being sealed at said inlet by a first sealing member, and sealed at said outlet by a second sealing member, wherein said piston is biased against said stop by said biasing member unless water in said inlet reaches a threshold water pressure; engaging a plurality of emission devices with the outlets of said plurality of pressure actuated valves; and providing water under pressure to said irrigation line. The methods may further comprise the step of: adjusting said threshold water pressure by adjusting a tension on said biasing mechanism.

In use, embodiments of the valves of the present invention may normalize the timing and volume of water provided to all areas covered by the irrigation system. The irrigation system may include a water source located, for example, at a corner of a large crop field. The water source may be in fluid communication with the emission devices of the irrigation system via a primary irrigation line (e.g., running long one or more sides of the field) and a plurality of secondary irrigation lines branching therefrom (e.g., running across sections of the field), each of the secondary irrigation lines being in fluid communication with a plurality of pressure actuated valves of the present invention, spaced along the length of the corresponding secondary irrigation line. In other embodiments, the water source may be in direct fluid communication with a single irrigation line, the single irrigation being in fluid communication with a plurality of pressure actuated valves of the present invention, spaced out along the length of the single irrigation line. In yet other embodiments, the system may include a grid-like pattern in which secondary irrigation lines are in communication with each other at each end.

Before introducing water into a system equipped with valves of the present invention, the threshold water pressure needed to activate each of the valves should be established, such as by choosing a spring that will compress when the desired water pressure is reached, and making sure that all valves have springs of that same strength. As noted in an earlier example, this threshold should be below that required for the attached sprinklers to fully function, but should be higher than that needed to seal all joints (if present) in the irrigation system pipes. When it is time to water the field, the water source may be opened and irrigation water may begin flowing from the water source down the primary and secondary irrigation lines (or down the single irrigation line), reaching the pressure actuated valves of the system, starting with those valves closest to the water source to eventually reaching those valves farthest from the water source. While the irrigation lines are filling, water pressure at the closest pressure actuated valves may not reach the threshold water pressure. The flow of water may continue to flow through the primary and secondary irrigation lines until the entire system (i.e., all interconnected irrigation lines) fills with water, and any joints between pipes are sealed. Water pressure will then continue to build in the system as a whole until the threshold water pressure is reached. If full pressure in the system is expected to be low, embodiments of valves of the present invention may be adjusted to allow actuation at such low pressures. When the threshold pressure is reached, all of the pressure actuated valves in the system may actuate substantially simultaneously, providing water to all areas of the field at substantially the same time with substantially the same amount of water. Water pressure may continue to increase until it reaches or exceeds a level where the sprinklers fully function. The U-cup seals in the valves help prevent unwanted friction (which could cause the valves to jam or stick), and helps prevent sand and other impurities from entering the inner chamber of the valves which might otherwise cause the valves to be damaged and/or malfunction.

It is therefore an object of the present invention to provide fluid start valves and related methods which may be actuated at a low threshold water pressure.

It is a further object of the present invention to provide to provide fluid start valves and related methods in which each valve has an internal vented chamber for housing a movable piston and a biasing mechanism, the chamber being sealed off from the flow of fluid through the valve and any impurities therein.

It is a further object of the present invention to provide fluid start valves and related methods in which a stop in each valve is urged toward the incoming flow of fluid into the valve and against a sealing member using a biasing mechanism which prevents fluid from passing through the valve until the pressure of the incoming fluid is sufficient to overcome the biasing member and separate the stop from the sealing member.

It is a further object of the present invention to provide fluid start valves and related methods in which the flow of fluid through each valve encounters minor turbulence so as to be delivered smoothly from an outlet of the valve with minimal pressure loss.

It is a further object of the present invention to provide fluid start valves and related methods which may be deployed on an irrigation line in conjunction with a plurality of emission devices such that each of the valves is activated substantially simultaneously once a threshold water pressure is reached in the irrigation line, thus providing water to all emission devices on the irrigation line at the same time.

It is a further object of the present invention to provide fluid start valves and related methods which allows a user to easily adjust the threshold water pressure required to actuate the valves.

It is a further object of the present invention to provide fluid start valves and related methods which provide even distribution of water or other fluids to all valves on a distribution line.

The above-described objects, advantages and features of the invention, together with the organization and manner of operation thereof, will become apparent from the following detailed description when taken in conjunction with the accompanying drawings, wherein like elements have like numerals throughout the several drawings described herein. Further benefits and other advantages of the present invention will become readily apparent from the detailed description of the preferred embodiments.

DETAILED DESCRIPTION

Figure 1A:
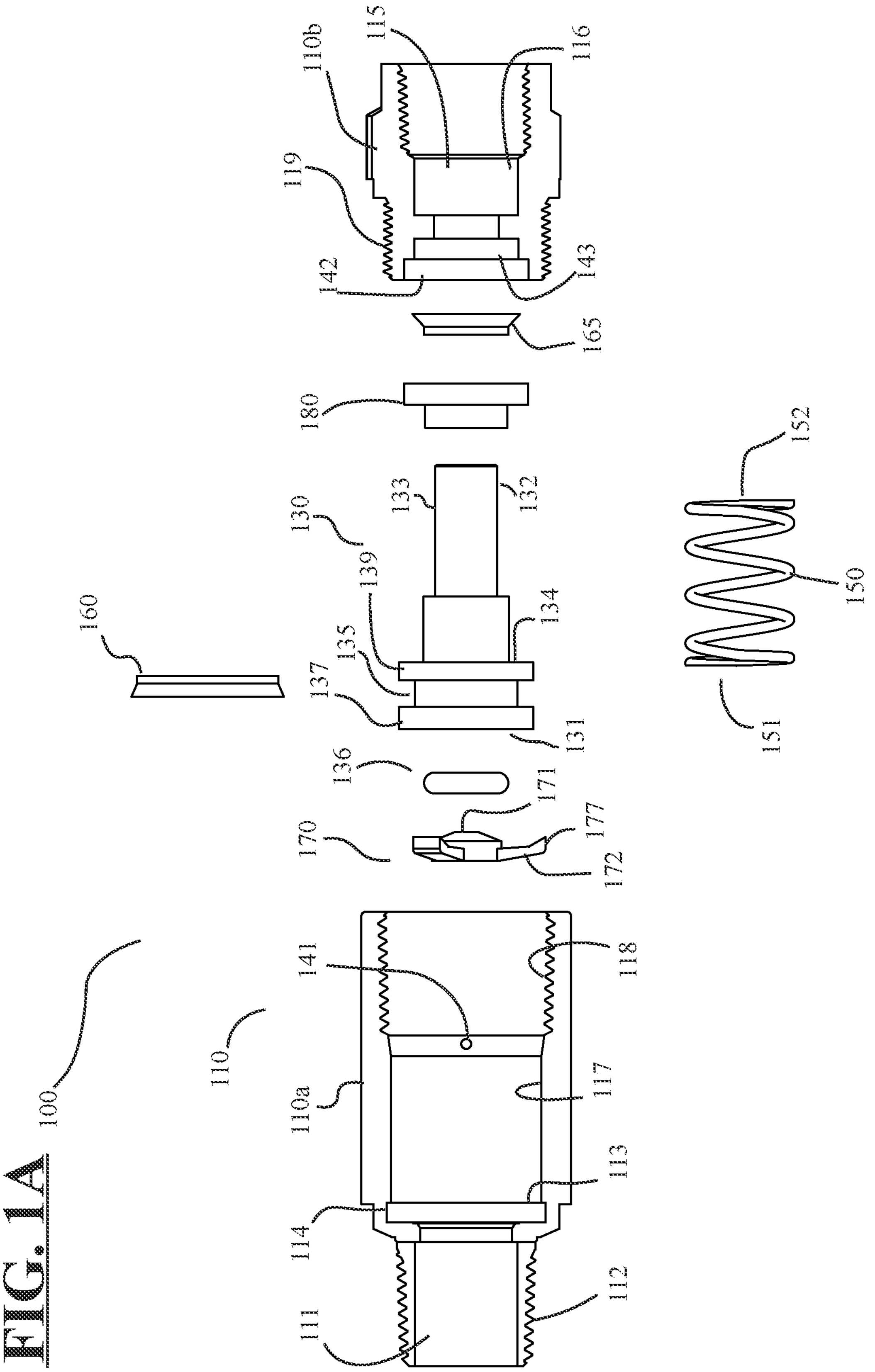
FIG. 1A is an exploded partial cross-sectional view of an embodiment of a valve of the present invention.
Figure 1B:
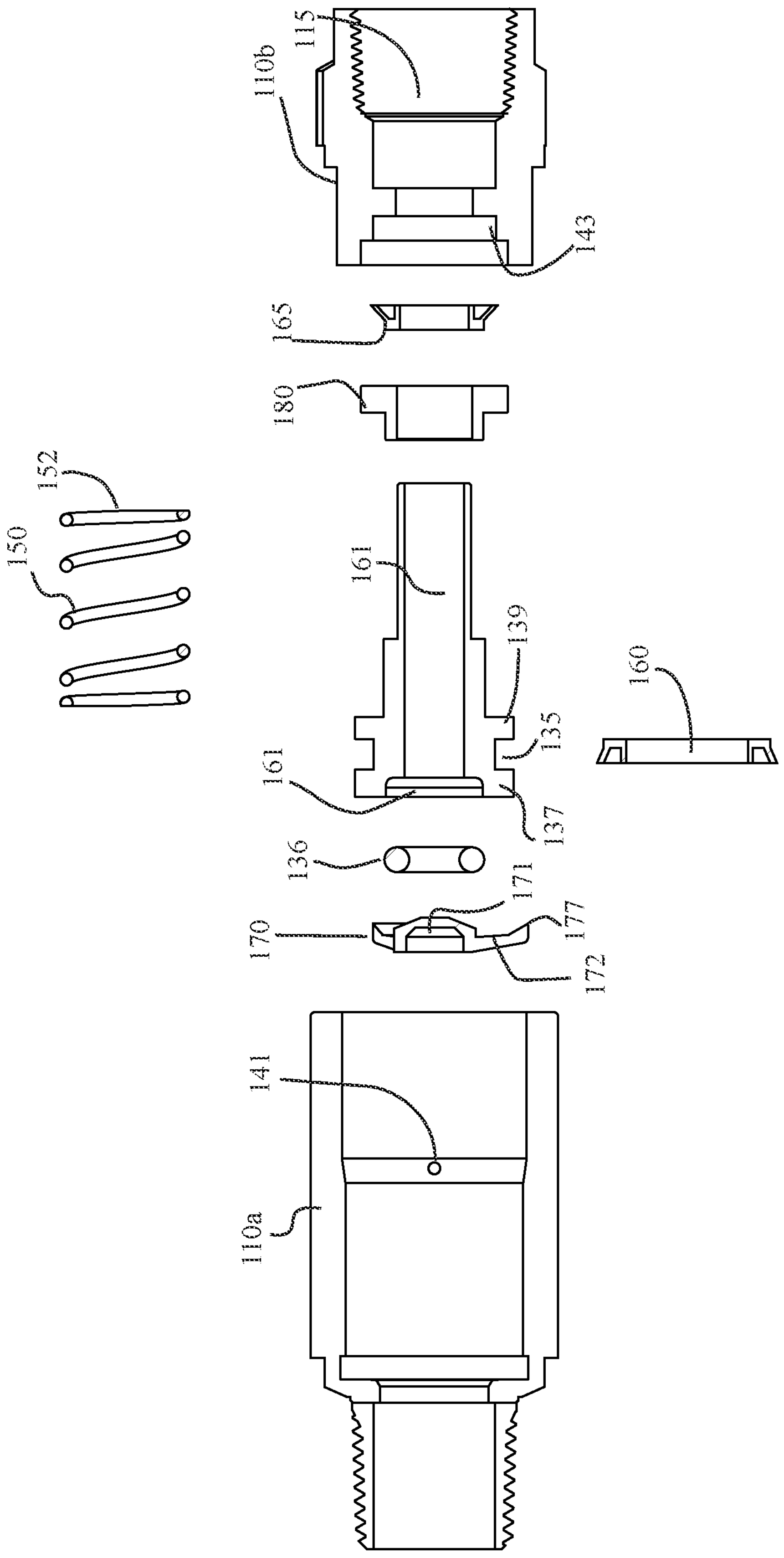
FIG. 1B is an exploded cross-sectional view of an embodiment of a valve of the present invention.

Reference will now be made in detail to certain embodiments of the invention, examples of which are illustrated in the accompanying drawings. While the invention will be described in reference to these embodiments, it will be understood that they are not intended to limit the invention. To the contrary, the invention is intended to cover alternatives, modifications, and equivalents that are included within the spirit and scope of the invention. In the following disclosure, specific details are given to provide a thorough understanding of the invention.

Referring to FIGS. 1A-1D, it is seen that the illustrated valve 100 includes a housing 110 which may be made of two parts **110*a* and 110*b* which may be coupled or joined together to form the entire housing 110. Housing 110 is provided with a fluid inlet 111 which may be placed in fluid communication with a fluid source, and a fluid outlet 115 which may be placed in fluid communication with an emission device. The first or lower part of the housing 110*a* is designed to engage at 112 with a water source such as an irrigation supply line. The second or upper part of the housing 110*b* is designed to engage at 116 with a fluid emission device such as a sprinkler or sprinkler head 191. The engagement 112 of the first part 110*a* may comprise a threading complementary to a threading of a connector of an irrigation line 190. The attachment mechanism 116 of the second part 110*b* may comprise a threading complementary to a threading of the emission device 191 (see FIG. 2**B).

Figure 1C:
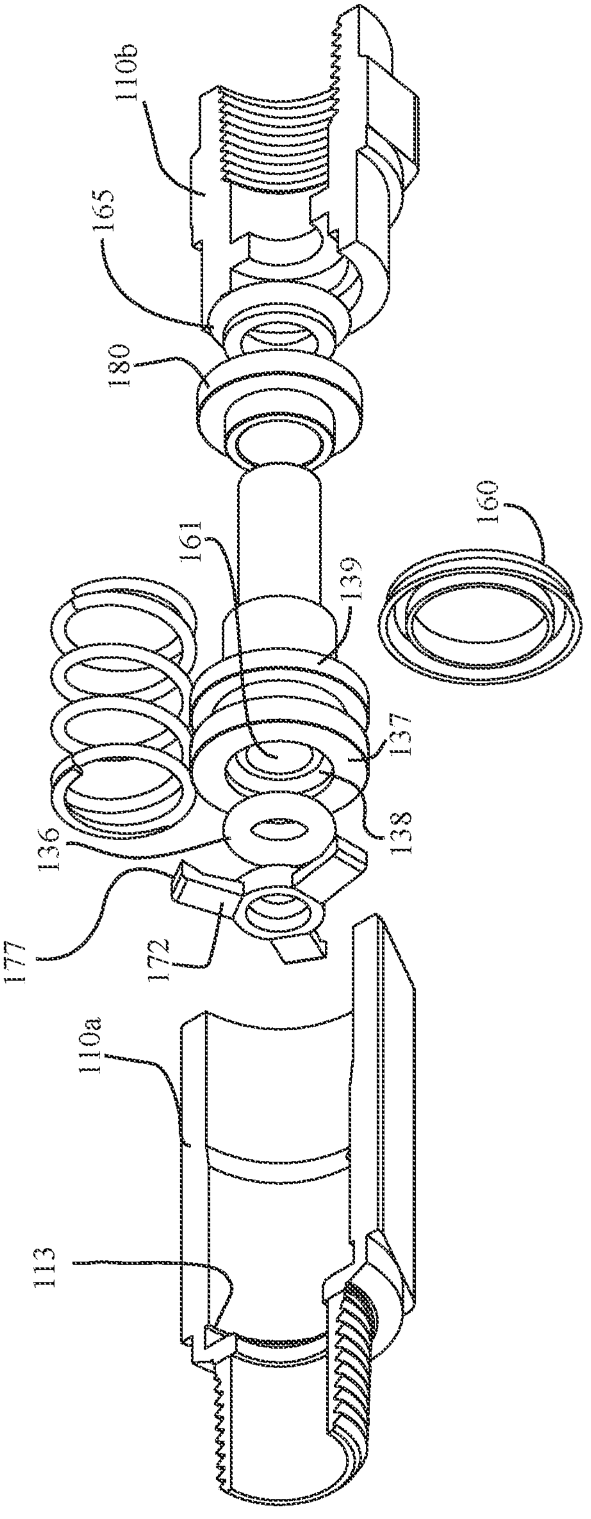
FIG. 1C is a perspective exploded partial cross-sectional view of an embodiment of a valve of the present invention.
Figure 1D:
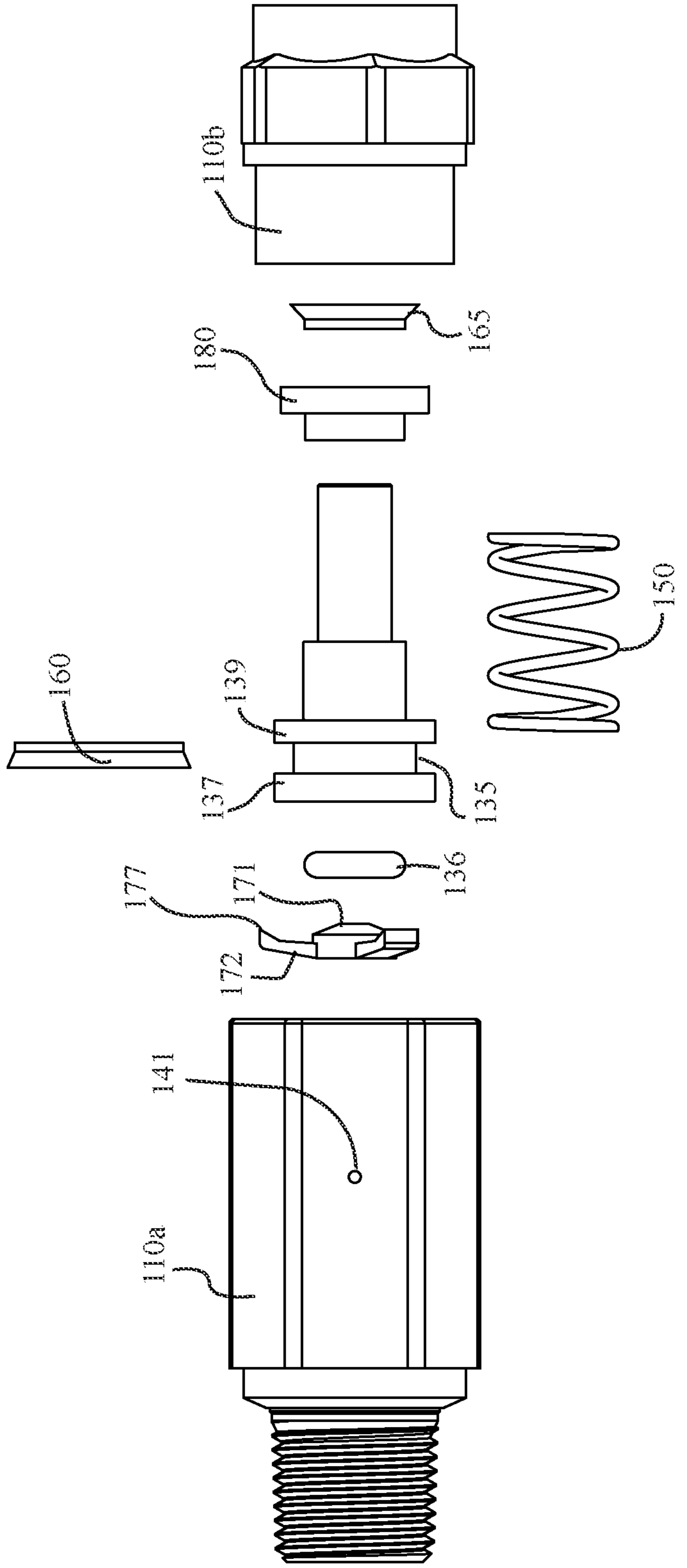
FIG. 1D is an exploded exterior side view of an embodiment of a valve of the present invention.
Figure 2A:
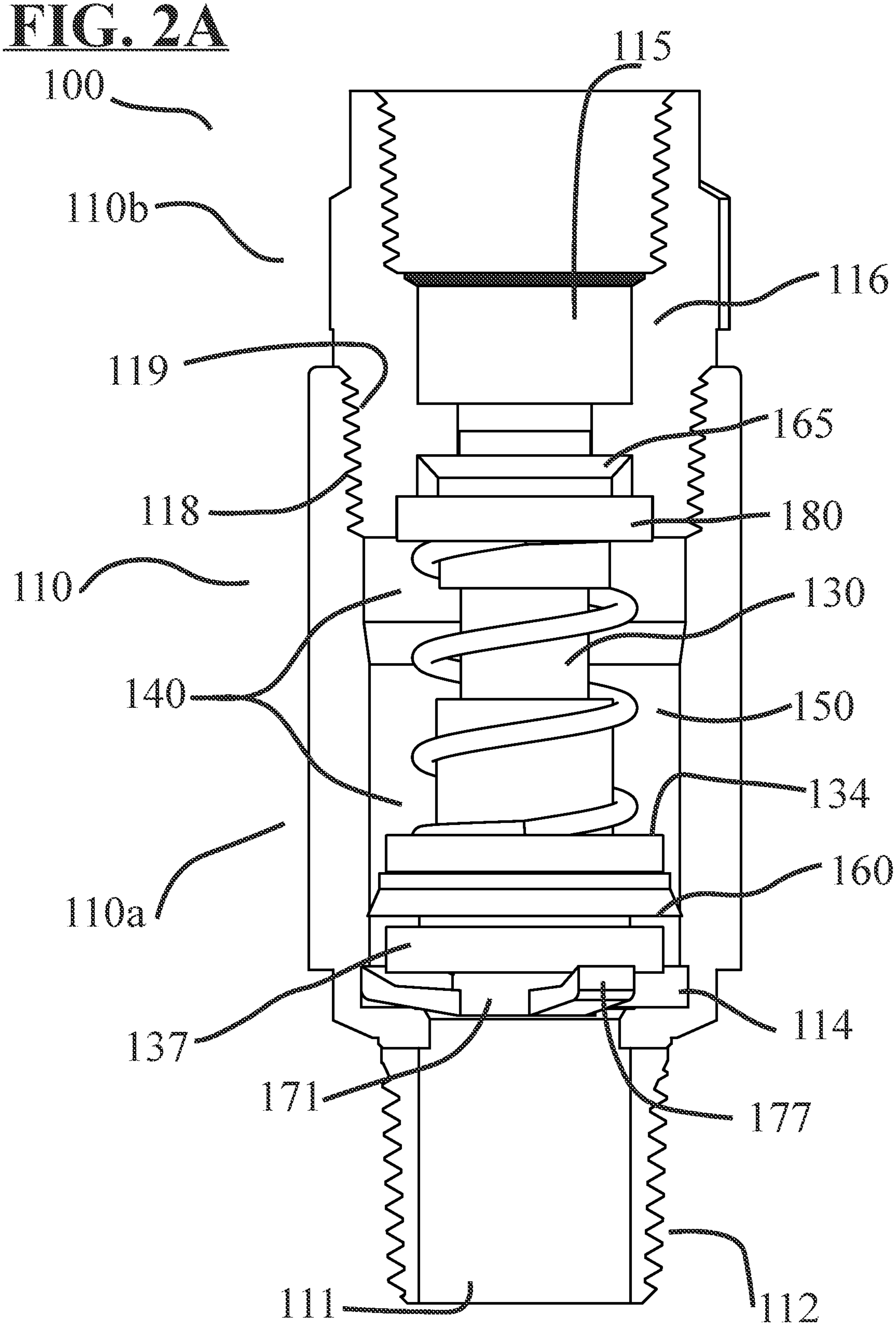
FIG. 2A is a partial cross-sectional view of an embodiment of a valve of the present invention.
Figure 2B:
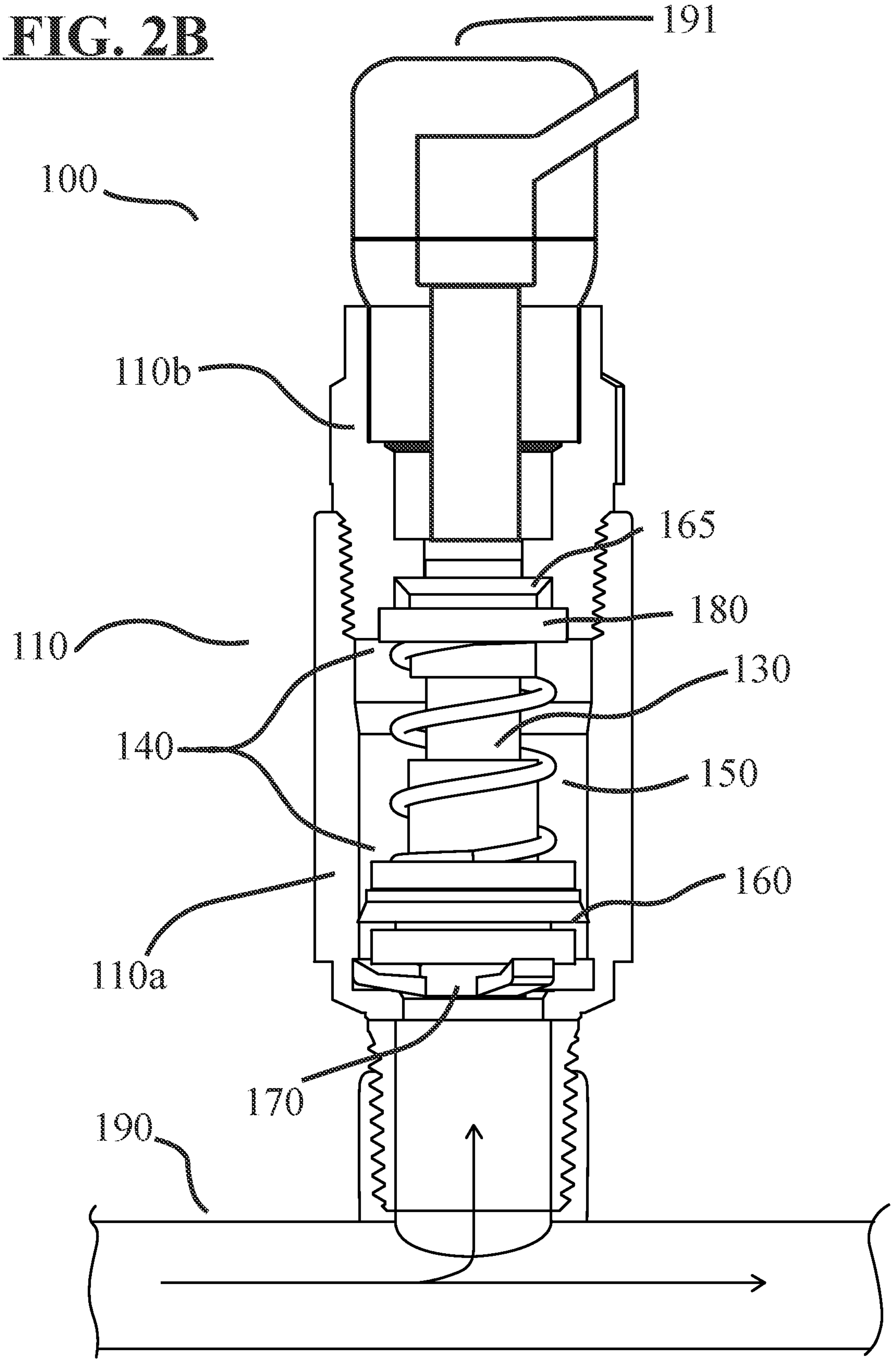
FIG. 2B is a partial cross-sectional view of an embodiment of a valve of the present invention installed on an irrigation line and engaged with an emission device.
Figure 2C:
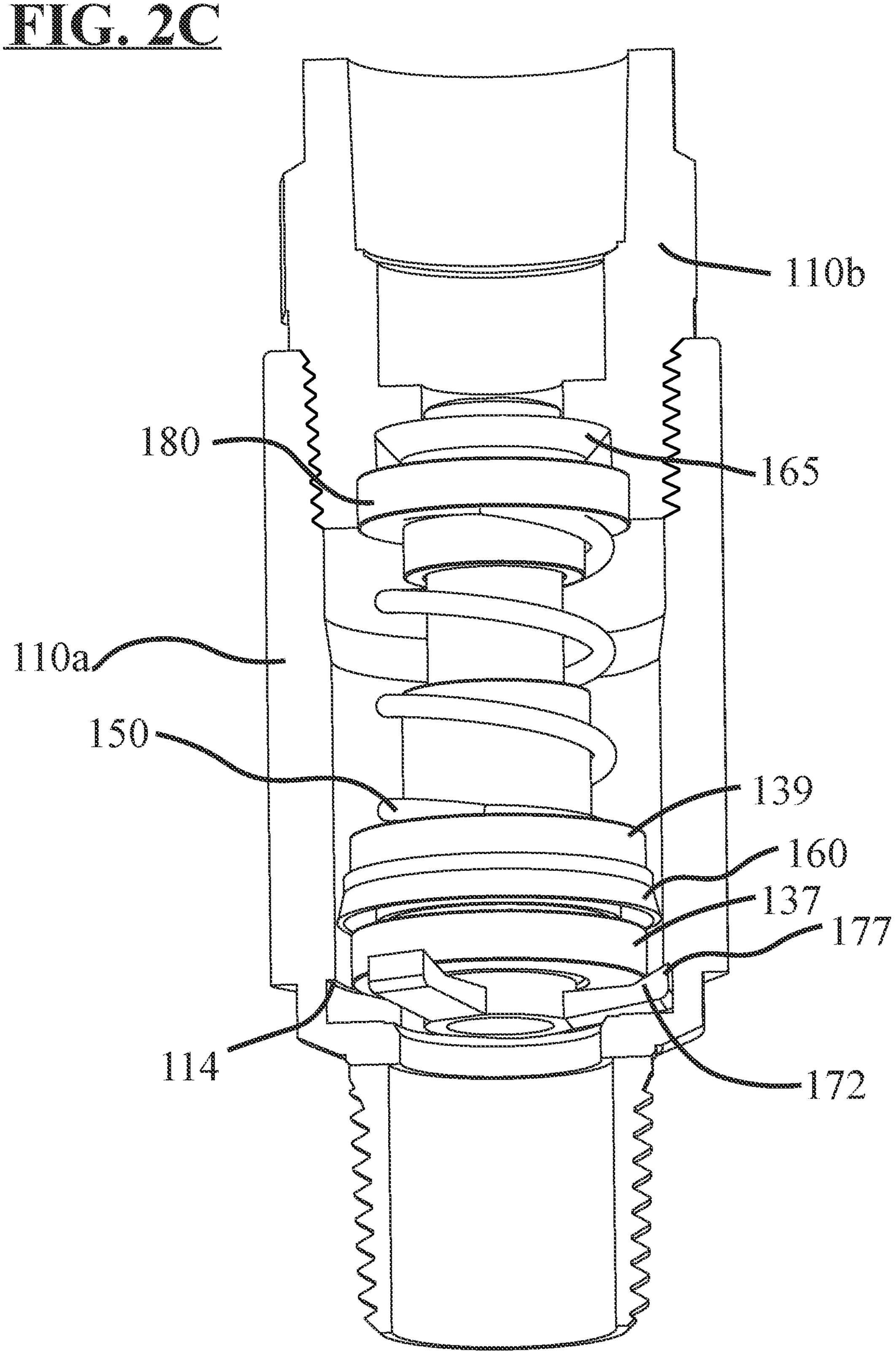
FIG. 2C is a cross-sectional view of an embodiment of a valve of the present invention showing the valve in a closed condition.
Figure 2D:
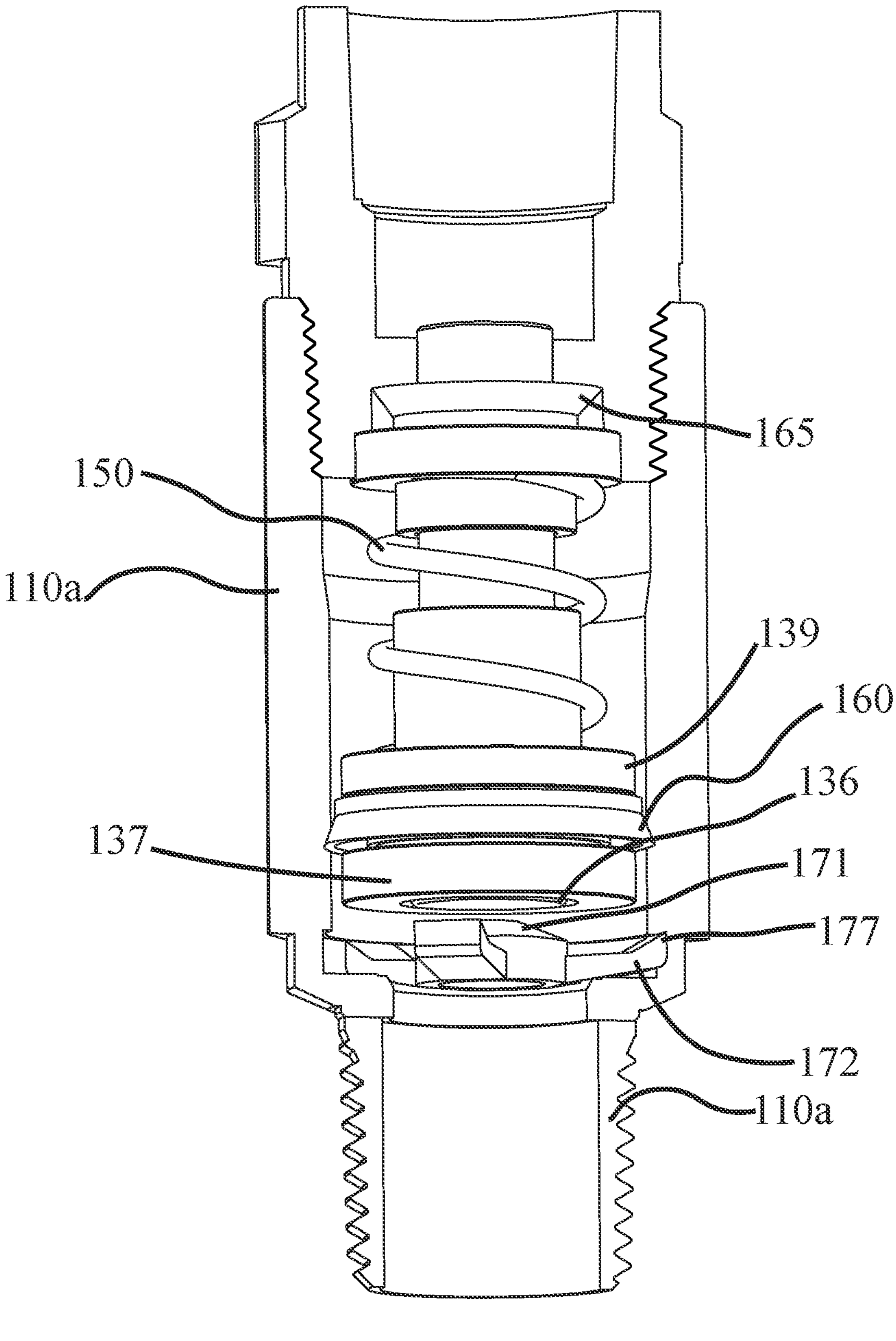
FIG. 2D is a cross-sectional view of an embodiment of a valve of the present invention showing the valve in an open condition.
Figure 3:
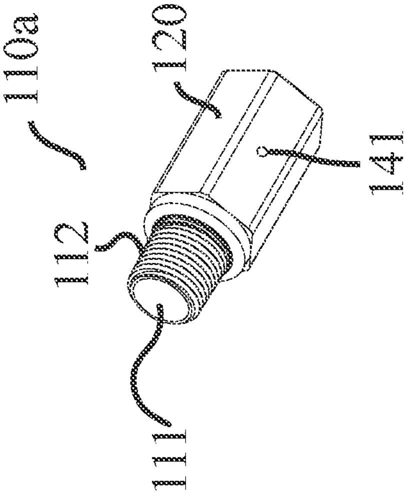
FIG. 3 is a perspective view of an embodiment of an inlet segment (lower housing) of a housing of a valve of the present invention.
Figure 4:
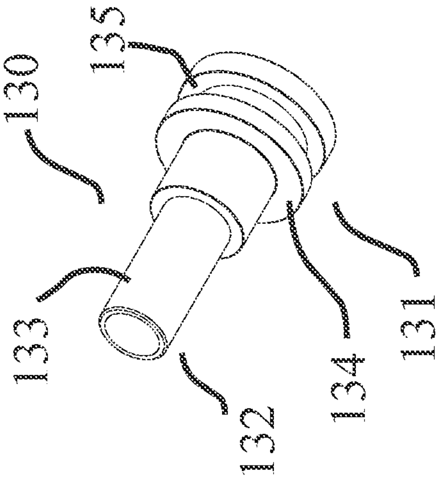
FIG. 4 is a perspective view of an embodiment of a water passage piston of a valve of the present invention.
Figure 5:
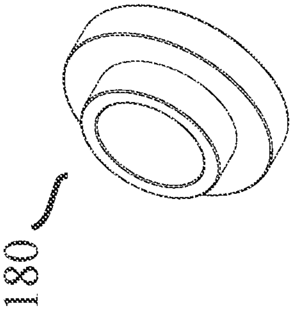
FIG. 5 is a perspective view of an embodiment of a piston guide of a valve of the present invention.
Figure 6A:
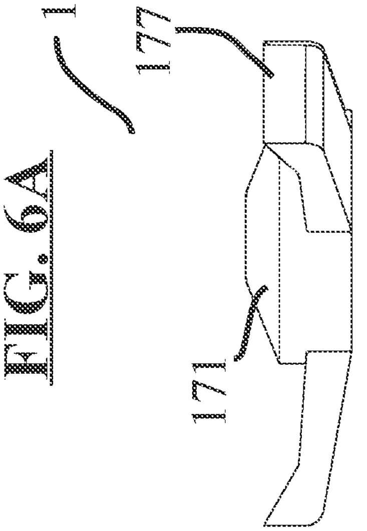
FIG. 6A is a side view of an embodiment of a stop of a valve of the present invention.
Figure 6B:
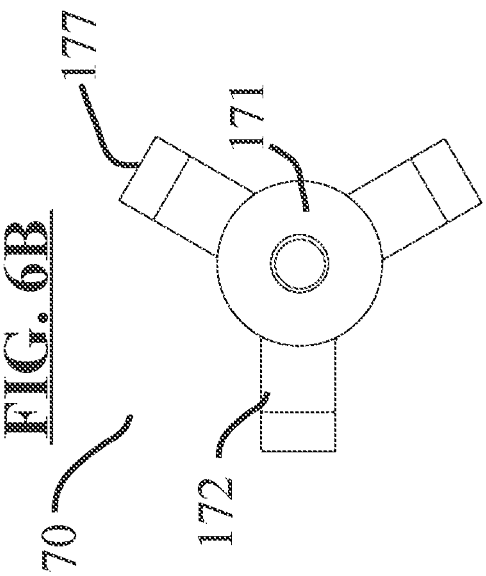
FIG. 6B is a top view of an embodiment of a stop of a valve of the present invention.

When coupled together as shown in FIGS. 2A-2D, housing 110 defines an internal chamber 140. A hollow water passage piston 130 nested within the chamber 140, the piston 130 comprising an inlet end 131 and an outlet end 132. Chamber 140 is sealingly separated from the inlet 111 using a first sealing member 160, and chamber 140 is sealingly separated from the outlet 115 using a second sealing member 165. Sealing members 160 and 165 are preferably cup seals having angled annular edges, and may flare out in a frustoconical manner away from the interior of chamber 140. In the illustrated embodiments, as shown in FIG. 1, a first (lower) seal 160 may flare out toward inlet 111, and a second (upper) seal 165 may flare out toward outlet 115. The outer edges of seals 160 and 165 are designed to sealingly engage, respectively, the internal cylindrical wall 117 of the inlet 110 and the internal cylindrical wall 143 of the outlet 115. It is to be appreciated that in some embodiments, the shape of seal 165 is similar to that of seal 160, as shown in FIG. 1C. The inner edge of lower seal 160 is designed to sealingly engage a lower peripheral edge of piston 130, preferably at a circumferential groove 135 at an inlet end 131 of piston 130. The inner edge of upper seal 165 is designed to sealingly engage a peripheral edge 133 of the outlet end 132 of piston 130. The flared cup seals have less surface contact with the respective inside cylindrical walls of the chamber than O-rings would, thereby reducing friction and reducing the potential for the seals to get stuck against the walls which might prevent the piston from reciprocating. The seals also help prevent impurities such as sand or other materials from entering chamber 140 where they could cause malfunctions or damage to the piston 130 and/or biasing member 150 inside the chamber.

Piston 130 has a generally cylindrical configuration, and is deployed inside chamber 140 and has a hollow central bore 161 leading from an inlet end 131 to an outlet end 132 of piston 130. The cylindrical inlet end 131 of piston 130 is wider than the cylindrical outlet end 132, and may include a terminal ring 137. Ring 137 may include an internal recess 138 for receiving an O-ring 136. Piston 130 may also include a second ring 139 near the inlet end defining a circumferential recess or groove 135 into which seal 160 may be engaged. Sandwiching seal 160 in recess 135 between ring 137 and ring 139 prevents seal 160 from sliding up and down along piston 130 as it reciprocates inside chamber 140. The outlet end 132 of piston 130 slidably extends through a guide ring or washer 180. Guide ring 180 is designed to engage an annular shoulder 142 of a cylindrical opening in housing **110*b*. Cup seal 165 is provided in a smaller cylindrical opening 143 adjacent to shoulder 142, and is held in place by guide ring 180**.

A movable stop 170 is provided at the inlet end of housing **110*a* adjacent to movable O-ring seal 136. Stop 170 includes a plurality of legs 172 defining openings between them through which fluid may pass when the valve is open. Stop also includes a central section or head 171 which may be temporarily sealingly engaged with seal 136. The central section 171 may comprise a frusto-conical shape, wherein the side of the cone may contact the passage seal 136, forming a watertight seal therewith. The plurality of support arms 172 may support the central member 171 against the biasing force of the biasing mechanism 150. Each support arm 172 has an edge 177 that engages a shoulder 113 of the inlet 111, securing stop 170 in place within a circumferential groove 114 in the inner surface 117 of the housing 110. By this engagement of edges 177 in groove 114, stop 170 is prevented from moving toward piston 130 when fluid pressure increases, and from moving away from piston 130** when fluid pressure decreases.

Biasing member or spring 150 is provided around the body of piston 130. A lower end 151 of spring 150 is engaged against an inside edge 132 of ring 139, and an upper end 152 of spring 150 is engaged against an inner edge of guide ring 180. When housing parts **110*a* and 110*b* are coupled together around the piston and spring assembly (which includes piston 130, spring 150, stop 170, O-ring 136, lower seal 160, guide ring 180 and upper seal 165), spring 150 urges piston 130 and O-ring 136 against the head 171 of stop 170. This creates a seal between the head 171 of stop 170 and O-ring 136, preventing fluid from passing through the inlet end 131 into bore 161 of piston 130. See FIG. 2B. Thus, piston 130 is biased against said stop 170 by said biasing mechanism 150 until fluid pressure in said inlet 111 is greater than the biasing force of said spring 150. When fluid pressure reaches or exceeds the biasing force of spring 150, piston 130 is pushed away from inlet 111 causing O-ring 136 to be separated from the head 171 of stop 170. This separation occurs because edges 177 of arms 172 of stop 170 are engaged with groove 114 preventing stop 170 from moving. The separation of seal 136 from stop 170 allows fluid to flow between arms 172 of stop 170 and into the hollow central bore 161 of piston 130. The fluid then exits from the piston at outlet 132 and passes through outlet 115 of housing 110***b* to fluid a emitter or sprinkler 191.

It is to be appreciated that it is possible to change the threshold water pressure needed to activate the valve by using different springs 150 with different strengths. A stronger spring will require more (higher) water pressure to activate the valve than a weaker spring. It is preferred that all springs in all valves in a given irrigation system have the same strength so that the same water pressure is needed to open all of the valves simultaneously. In alternative embodiments, the threshold water pressure needed to activate the valve may be changed by changing the length of the chamber. This may be accomplished by partially threading or unthreading the housing parts 110*a* and 110*b*. This would have the effect of shortening or lengthening the distance covered by the spring. Reducing this distance would increase the amount of water pressure needed to overcome the spring, and expanding this distance would reduce the amount of pressure needed. Valves having chambers of different lengths may also be used, either with or without changing the springs, to adjust the amount of water pressure needed for activation.

The housing 110 may comprise one or more vents 141 for equalizing air pressure inside chamber 140 of housing with air pressure outside the housing 110. Each vent 141 may comprise a passage traversing the wall of the housing 110, from the inner surface 117 of the housing to the outer surface 120. Each vent 141 may be operable to allow air to pass from the chamber 140 to the atmosphere and vice versa.

As noted above, housing 110 may be operable to be separated into an inlet segment 110*a* and an outlet segment 110*b*. The housing 110 may thus allow access to the chamber 140 and to the internal components of the valve 100 (e.g., the water passage 130, the sealing members 160, 165, the biasing mechanism 150, the inner end of the vent 141, and guide 180) as well as stop 170 and seal 136. The inlet segment 110*a* may comprise a threading 118 having a shape complementary to a threading 119 of the outlet segment 110*b*. The complementary threadings 118, 119 may allow for adjustment of the overall length of the housing 110 and therefore adjustment of the length of the chamber 140 which is defined in part by the housing 110. The valve 100 of the present invention may thus allow for adjustment of the load on the biasing mechanism 150 housed in the chamber 140, and thereby adjust the threshold water pressure which is required to overcome the force of the biasing mechanism 150 to actuate the valve 100.

The biasing mechanism 150 may comprise a spring having a first end 151 in contact with a chamber side 134 of the inlet end 131 of the water passage 130, and a second end 152 which is in contact with the passage guide 180 engaged with the outlet segment 110*b* of the housing 110. Threading the outlet segment 110*b* further into the inlet segment 110*a* may therefore increase the load on the spring 150, thereby increasing the biasing force on the chamber side 134 of the inlet end 131. Conversely, unthreading the outlet segment 110*b* may reduce the load on the spring 150, reducing the biasing force on the chamber side 134 of the inlet end 131. Thus, threading the outlet segment 110*b* into or out of the inlet segment 110*a* may also increase or decrease, respectively, the threshold water pressure required to actuate the valve 100.

The water passage may comprise an inlet end 131 and an outlet end 132. The inlet end may 131 comprise a circumferential groove 135 having a shape complementary to a shape of the first sealing member 160, which may securely nest within the circumferential groove 135, maintaining watertight contact with both the inlet end 131 and an inner surface 117 of the housing 110. The inlet end 131 may comprise an opening, the opening providing fluid communication through the water passage 130 to the outlet end 132. The opening may comprise the passage seal 136. The passage seal 136 may be substantially ring-shaped with a circular cross section. The passage seal 136 may comprise an elastic material operable to withstand compression between the inlet end 131 and the stop 170 while maintaining watertight contact with each.

The outlet end 132 of the piston 130 may comprise a substantially smooth outer surface 133 having a substantially cylindrical shape. The outer surface 133 may be operable to maintain watertight contact with a surface of a second sealing member 165 positioned in the outlet segment 110*b*. The distal-most edge of the outlet end 132 may traverse and extend past the second sealing member 165, into the outlet 115 of the housing 110.

The passage guide 180 may be operable to control a position of the outlet end 132 of the piston 130. The passage guide 180 may comprise a collar nested in a shoulder of the outlet segment 110*b*, the collar having an inner diameter substantially similar to an outer diameter of the outlet end 132, and having an outer diameter substantially similar to an inner diameter of a first tier 142 of the shoulder of the outlet segment 110*b*. The second sealing member 165 may be nested in the second tier 143 of the shoulder area and may be operable to maintain watertight contact with both a surface of the second tier 143 and the outer surface 133 of the outlet end 132, thus preventing water from passing from the outlet 115 into the chamber 140. The passage guide 180 may be installed over the second sealing member 165, such that the second sealing member 165 is secured in the second tier 143 by the passage guide 180. The second end 152 of the spring may provide a force against the passage guide 180, securing the passage guide 180 in the first tier 142 of the shoulder area.

The foregoing descriptions of specific embodiments of the present invention have been presented for purposes of illustration and description. They are not intended to be exhaustive or to limit the invention to the precise forms disclosed, and many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated.

What is claimed is:

1. A valve for an irrigation system comprising:

a) a housing comprising two parts which define an internal chamber when coupled together, a first of said parts of said housing having an inlet in fluid communication with an irrigation line, and a second of said parts having an outlet in fluid communication with a sprinkler head, said inlet further comprising a stop, and said chamber having a central axis therethrough;

b) a hollow piston inside said chamber, said piston having a fluid passageway therethrough that is aligned with the central axis of said chamber, said piston having an inlet to said passageway adjacent to the inlet of said first of said parts, an outlet from said passageway adjacent to the outlet of said second of said parts, and a seal at said piston inlet operable to provide watertight sealing against said stop;

c) a biasing member in said chamber, said biasing member being operable to bias said seal against said stop until overcome by increased pressure from water entering the inlet of said first of said parts reaching or exceeding a threshold pressure;

d) a first sealing member operable to provide a watertight seal directly between said piston and an interior surface of said first of said parts;

e) a second sealing member operable to provide a watertight seal directly between said piston and an interior surface of said second of said parts; and f) at least one air vent in a wall of said chamber.

2. The valve of claim 1 wherein the seal at said piston inlet is an O-ring, said first sealing member is a cup seal, and said second sealing member is a cup seal.

3. The valve of claim 1 wherein said stop comprises a central head for temporary engagement with said seal, and a plurality of arms having gaps between them through which fluid may flow, each of said arms being engaged with a circumferential cylindrical groove in the first part of said housing for holding said stop in place.

4. The valve of claim 3 wherein an exterior surface of said piston is located between a pair of exterior annular rings defining a circumferential gap therebetween and wherein said first sealing member is provided in said circumferential gap.

5. The valve of claim 4 further comprising an annular guide slidably engaged around said piston and wherein said second sealing member is provided around an end of said piston between said annular guide and the second part of said housing.

6. The valve of claim 3 wherein said third sealing member comprises a ring shape to provide a watertight seal against the central head of said stop to prevent water from entering the hollow piston while in a sealed position.

7. The valve of claim 1 wherein a length of said chamber may be adjusted by adjusting the distance between the housing parts in order to change an amount of threshold water pressure needed to move said biasing member.

8. The valve of claim 7 wherein said housing parts comprise complementary threadings, and said threshold water pressure is adjusted by threading said housing parts into or out of each other.

9. The valve of claim 1 wherein said biasing member is a removable spring which encircles said piston.

10. A method of using irrigation start valves comprising the steps of:

a. providing an irrigation line having a plurality of openings thereon;

b. installing a pressure actuated valve at each such opening, each of said pressure actuated valves comprising a housing comprising two parts which define an internal chamber when coupled together, a first of said parts of said housing having an inlet in fluid communication with said irrigation line, and a second of said parts having an outlet in fluid communication with a sprinkler head, said inlet further comprising a stop, and said chamber having a central axis 10 therethrough;

a hollow piston traversing said chamber, said piston having a fluid passageway therethrough that is aligned with the central axis of said chamber, said piston having an inlet to said passageway adjacent to the inlet of said first of said parts, an outlet from said passageway adjacent to the outlet of said second of said parts, said first of said parts being sealed by a first sealing member located directly between said piston and said first of said parts, and said second of said parts being sealed by a second sealing member located directly between said piston and said second of said parts, wherein said piston is biased against said stop by a biasing member until overcome by increased pressure from water in said inlet reaching or exceeding a threshold water pressure;

c. engaging a plurality of sprinkler heads with the outlets of said plurality of pressure actuated valves; and d. providing water under pressure to said irrigation line such that when the threshold water pressure is reached, the piston is separated from the stop on each of the plurality of valves.

11. The method of claim 10 wherein an O-ring seal is provided on each piston that is urged against each stop by each biasing member.

12. The method of claim 10 wherein, each first sealing member is a cup seal, and each second sealing member is a cup seal.

13. The method of claim 10 further comprising the step of adjusting said threshold water pressure of at least one of said plurality of valves by adjusting a tension on the biasing mechanism of said at least one valve.

14. The method of claim 10 further comprising the steps of removing and replacing the biasing members on each valve in order to adjust the threshold water pressure needed to activate each valve.

15. The method of claim 10 wherein said housing parts comprise complementary threadings, and comprising the additional step of unthreading the first and second housing parts to increase the length of the chamber in order to reduce the threshold water pressure needed to separate the piston from the stop of each valve.

16. The method of claim 10 wherein said housing parts comprise complementary threadings, and comprising the additional step of threading the first and second housing parts together to decrease the length of the chamber in order to increase the threshold water pressure needed to separate the piston from the stop of each valve.

17. The method of claim 10 wherein the threshold water pressure is less than the pressure needed to fully operate each of said plurality of emission devices.

* * * * *